Feb. 26, 1924.
J. LUSTIG
1,484,837
AUTOMOBILE SIGNAL CONTROL
Filed June 3, 1922
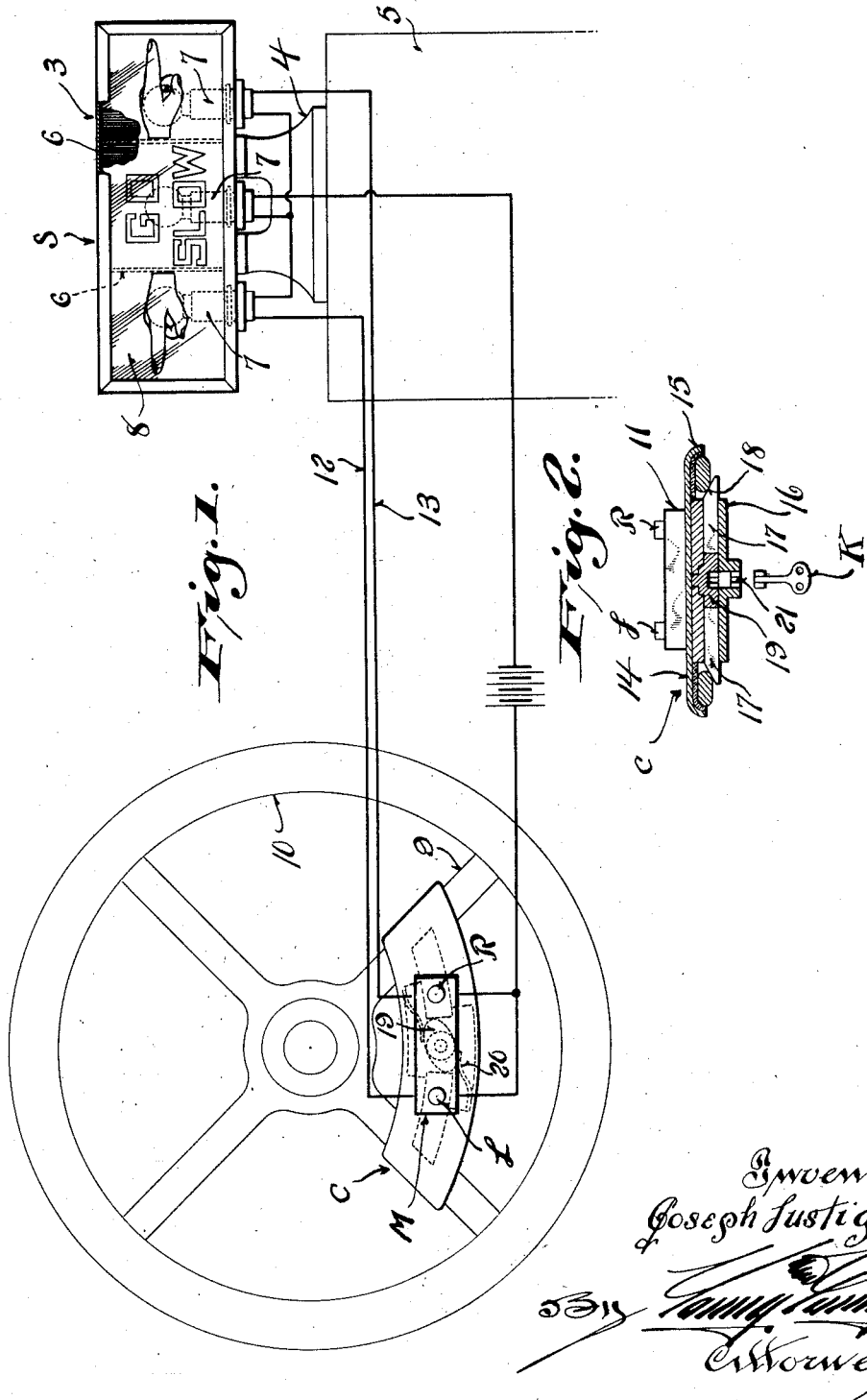
Inventor:
Joseph Lustig Patented Feb. 26, 1924.                                   1,484,837

UNITED STATES PATENT OFFICE.

JOSEPH LUSTIG, OF NORTH MILWAUKEE, WISCONSIN.

AUTOMOBILE SIGNAL CONTROL.

Application filed June 3, 1922. Serial No. 565,525.

*To all whom it may concern:*

Be it known that I, JOSEPH LUSTIG, a citizen of the United States, and resident of Milwaukee, in the county of Milwaukee and State of Wisconsin, have invented certain new and useful Improvements in Automobile Signal Controls; and I do hereby declare that the following is a full, clear, and exact description thereof.

This invention pertains to signals for motor vehicles, and more particularly to switch for actuating said signals.

The invention consists in a switch for an electrically operated signal adapted to indicate the intention of the driver to reduce his speed or turn either to the left or right, and controlling means capable of being attached to the steering wheel of the vehicle.

The object of the invention is to provide a signal control adapted to be readily attached and locked to the steering wheel of a motor vehicle, thus ensuring the switch against theft or removal and at the same time rendering manipulation or control of the signal convenient for the operator.

With the foregoing and other objects in view, which will be more apparent as the description proceeds, the invention consists in what is herein shown and described and more particularly pointed out and defined by the appended claims, it being understood that various modifications and changes in the structural details are contemplated as within the scope of the appended claims.

In the drawings,

Figure 1 is an elevational view of the invention, diagrammatically illustrating the application of the same, and Figure 2 is a transverse sectional view taken thru the signal control.

Referring now more particularly to the accompanying drawings, the invention is illustrated in combination with a vehicle signal S, comprising a housing 3, provided with an attaching bracket 4, whereby the signal can be secured to either the front or rear fender 5 of a vehicle. The housing 3 is divided into a plurality of compartments by the partitions 6, which compartments carry the incandescent lamps 7. The face of the signal is provided with transparent glass 8 of any desired color, that portion of the glass in register with the right and left compartments being provided with the image of a hand indicating a "right" and "left" direction respectively. The central portion of the glass, which registers with the central compartment, bears the words "Go slow," to indicate the drivers' intention to reduce his speed.

While I have shown merely one face of the signal provided with a transparent glass containing the various signals, it will be understood that in cases where it is desired to impart information to those in front of the car, both sides of the signal will be provided with a glass.

For the purpose of actuating the signal S, I provide a novel switch control C, which, in order to render control of the signal convenient to the operator, I propose to fasten to the arms 9 of the steering wheel 10. The control C comprises a switch box 11, provided with buttons L and R, which, upon depression, will close the circuits to indicate respectively, "left" and "right" turns.

It will be noted that the lamp 7, positioned in the central compartment, is wired in series with both the circuits 12 and 13. Thus as the button L is depressed, the central and left hand compartment will be illuminated, while actuation of the button R will illuminate the central and right hand compartment.

To eliminate the necessity of drilling holes in the arms of the steering wheel, in order to attach the control C, I mount the switch box 11 on a plate 14, provided with downwardly turned ends 15, adapted to straddle the arms 9. The lower surface of the plate 14 has secured thereto, a lock housing 16, which carries the slidable plungers 17, said plungers having their ends tapered at 18 and adapted to engage the arms 9 in order to prevent theft or removal of the control C. The plungers 17 are projected by means of an eccentric 19, disposed between their adjacent ends, the eccentric being yieldably held against rotation which will prevent the plungers from being forced inwardly by the springs 20, which springs also tend to rotate the eccentric to expand or project the plungers and ensure a tight engagement with the arms 9. When it is desired to remove the control C, the eccentric 19 is rotated against the tension of the springs 20 by means of a key K, which is inserted thru the opening 21, provided in the lock housing 16.

From the foregoing, it will be seen that a signal control of very simple construction and neat appearance has been provided which may be readily attached to the arms of a steering wheel without the necessity of any cumbersome mechanical operations, its removal requiring a key, thereby ensuring the device against theft.

I claim:

1. An electric switch adapted to be attached to a spoked steering wheel of an automobile, said switch comprising a plate adapted to span the space between adjacent spokes and having down-turned edges adapted to overhang such spokes, switch elements carried upon the upper side of said plate, a housing carried upon the under side of said plate, a pair of plungers projecting in opposite directions through said housing, a cam member positioned within said housing and adapted to be controlled by a key to force said plungers outwardly into engagement with the under side of said spokes, and yieldable means for urging said cam member into plunger projecting position.

2. An electric switch adapted to be attached to a spoked steering wheel of an automobile, said switch comprising a plate adapted to rest upon adjacent spokes, switch elements carried by the upper side of said plate, a housing carried by the under side of said plate, plungers slidably projecting from said housing and having beveled faces adapted to engage the under side of such spokes, and resiliently actuated means for forcing said plungers outwardly and locking them in such outwardly extended position in engagement with said spokes, said means having an aperture therein adapted to receive a controlling key.

In testimony that I claim the foregoing I have hereunto set my hand at Milwaukee, in the county of Milwaukee and State of Wisconsin.

JOSEPH LUSTIG.